US009798628B2

(12) United States Patent
Woo et al.

(10) Patent No.: US 9,798,628 B2
(45) Date of Patent: Oct. 24, 2017

(54) MEMORY MIRRORING

(71) Applicant: Rambus Inc., Sunnyvale, CA (US)

(72) Inventors: Steven Woo, Sunnyvale, CA (US); David Secker, Sunnyvale, CA (US); Ravindranath Kollipara, Sunnyvale, CA (US)

(73) Assignee: Rambus Inc., Sunnyvale, CA (US)

( * ) Notice: Subject to any disclaimer, the term of this patent is extended or adjusted under 35 U.S.C. 154(b) by 158 days.

(21) Appl. No.: 14/568,848

(22) Filed: Dec. 12, 2014

(65) Prior Publication Data

US 2015/0309529 A1 Oct. 29, 2015

Related U.S. Application Data

(60) Provisional application No. 61/984,680, filed on Apr. 25, 2014.

(51) Int. Cl.
| | |
|---|---|
| *G06F 11/14* | (2006.01) |
| *G06F 1/12* | (2006.01) |
| *G06F 11/20* | (2006.01) |
| *G06F 11/16* | (2006.01) |
| *G06F 13/42* | (2006.01) |

(52) U.S. Cl.
CPC ............ *G06F 11/1456* (2013.01); *G06F 1/12* (2013.01); *G06F 11/1666* (2013.01); *G06F 11/2058* (2013.01); *G06F 11/20* (2013.01); *G06F 13/4234* (2013.01); *G06F 2201/84* (2013.01)

(58) Field of Classification Search
CPC .... G06F 1/12; G06F 11/1456; G06F 11/1666; G06F 11/2058; G06F 11/20
See application file for complete search history.

(56) References Cited

U.S. PATENT DOCUMENTS

| | | |
|---|---|---|
| 5,578,940 A | 11/1996 | Dillon et al. |
| 5,663,661 A | 9/1997 | Dillon et al. |
| 6,449,679 B2 | 9/2002 | Ryan |
| 6,658,478 B1 | 12/2003 | Singhal et al. |
| 6,675,272 B2 | 1/2004 | Ware et al. |
| 6,711,640 B1 | 3/2004 | Leddige et al. |
| 6,765,800 B2 | 7/2004 | Haba et al. |
| 6,976,114 B1 | 12/2005 | Ware |
| 7,301,831 B2 | 11/2007 | Ware |

(Continued)

OTHER PUBLICATIONS

PCT International Search Report and Written Opinion dated Jul. 8, 2015 in International Application No. PCT/US2015/024230. 27 pages.

*Primary Examiner* — Ryan Bertram
(74) *Attorney, Agent, or Firm* — Lowenstein Sandler LLP (57) ABSTRACT

Memory system enabling memory mirroring in single write operations. The memory system includes a memory channel which can store duplicate copies of a data element into multiple locations in the memory channel. The multiple locations are disposed in different memory modules and have different propagation times with respect to a data signal transmitted from the memory controller. In a write operation, the relative timings of the chip select, command and address signals among the multiple locations are adjusted according to the data propagation delay. As a result, a data element can be written into the multiple locations responsive to a data signal transmitted from the memory controller in a single transmission event.

24 Claims, 11 Drawing Sheets

(56) References Cited

U.S. PATENT DOCUMENTS

| | | | |
|---|---|---|---|
| 2002/0002662 A1 | 1/2002 | Olarig et al. | |
| 2003/0218477 A1 | 11/2003 | Jang et al. | |
| 2004/0193777 A1 | 9/2004 | LaBerge | |
| 2005/0010737 A1 | 1/2005 | Ware et al. | |
| 2005/0146939 A1 | 7/2005 | Conley et al. | |
| 2005/0262323 A1* | 11/2005 | Woo | G06F 13/1631 711/167 |
| 2006/0288177 A1* | 12/2006 | Shaw | G06F 11/10 711/162 |
| 2008/0077732 A1 | 3/2008 | Risse | |
| 2009/0106504 A1* | 4/2009 | Skerlj | G06F 13/1673 711/154 |
| 2011/0205832 A1* | 8/2011 | Jeon | G11C 7/1057 365/233.16 |
| 2012/0005396 A1 | 1/2012 | Sargeant et al. | |
| 2012/0124415 A1* | 5/2012 | Borkenhagen | G06F 11/1666 714/6.3 |
| 2012/0151128 A1 | 6/2012 | Yang | |
| 2014/0052906 A1 | 2/2014 | Thyagarajan et al. | |
| 2015/0095693 A1* | 4/2015 | Chinnakkonda Vidyapoornachary | G11C 14/009 714/6.23 |

* cited by examiner

MEMORY MIRRORING

CROSS REFERENCE

This application claims priority to U.S. provisional patent application No. 61/984,680, filed on Apr. 25, 2014, entitled "SYSTEM AND METHOD FOR MEMORY MIRRORING," by inventors Woo et al., the entire content of which is incorporated herein by reference.

BACKGROUND

Server memory systems play vital roles in enabling the information technology and business goals of a data center. To maximize system uptime for mission-critical applications and to help safeguard servers against certain types of memory errors, various technologies of utilizing Reliability, Availability, and Serviceability (RAS) features have been developed.

Memory mirroring generally refers to a RAS feature involving writing memory content to different places in physical system memory. In general, one set of memory locations is designated as the "primary" memory and the other set is designated as the "backup" memory. This second set of memory locations is not available to the operating system or applications for general access, but is rather reserved to store the backup copy of data in case the primary memory fails.

DETAILED DESCRIPTION

Embodiments of the present disclosure provide memory systems and processes enabling duplicate copies of a data element to be stored in different memory locations using a single write operation, thereby increasing memory throughput. In one embodiment, duplicate copies of a data element are written to different memory locations having the same signal latency (or propagation time) regarding command and data signals. As used herein and throughout this disclosure, "the same" refers to an intent for a value to be as close to the same as necessary such that any differences between the two items are immaterial in terms of function. For example, with respect to signal latency, the same signal latency for two DIMMs as discussed herein refers to a signal latency as close to the same as necessary such that data, clock and command signals can be issued by the memory controller without adjusting or accounting for any difference in signal latency between the two DIMMs. An exemplary memory system includes multiple groups of memory modules coupled to a memory channel. The modules in each group are configured to have the same latency for signals sent from the associated memory controller to the memory units. In another embodiment, the multiple memory locations assigned to store duplicate copies of a data element have different signal latency. In a write operation for this embodiment, the relative timings of the chip select, command and address signals among the multiple locations are adjusted according to the latency difference thereof such that the data element is written to the multiple locations using a single write data operation from the memory controller.

Accordingly, a data element can be concurrently written to multiple modules within a memory group in a single write operation, which may advantageously allow memory mirroring without consuming additional channel bandwidth and power as would be needed by conventional memory systems.

In a typical memory system, a memory controller is associated with a few memory channels. In one system type, each channel has a bus coupled to a number of dual in-line memory modules (DIMM) through respective DIMM sockets. In typical commercial CPU-based server memory system designs, each channel is configured to connect with three DIMMs. Each DIMM module further bears several memory chips, see FIG. 1A.

Based on the relative locations of the memory designated for the primary and backup copy, memory mirroring can be implemented as (1) intra-socket mirroring on the same channel, (2) intra-socket mirroring on different channels, or (3) inter-socket mirroring.

In intra-socket mirroring on the same channel, primary and backup copies are stored in the same memory channel, e.g., in different DIMM modules. In intra-socket mirroring on different channels, the primary and backup copies are stored in different channels connected to the same memory controller. In inter-socket mirroring, the primary and backup copies are stored in memory channels that are coupled to different memory controllers.

Figure 1A:
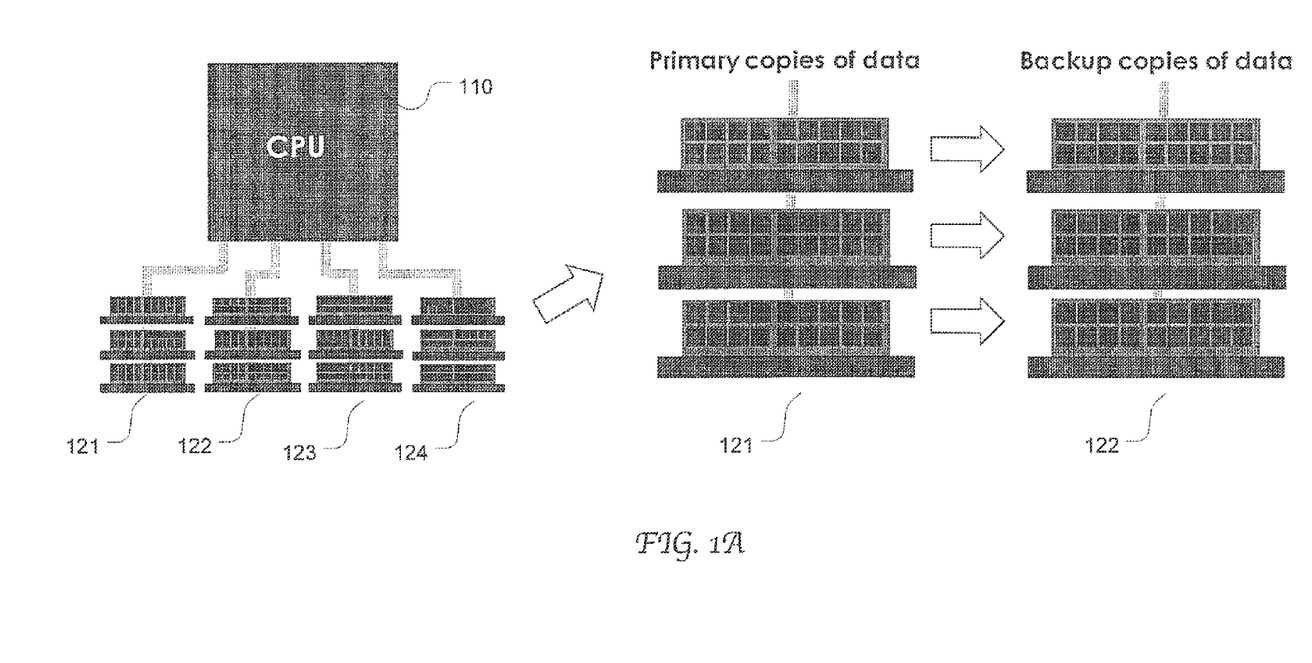
FIG. 1A illustrates a memory system operable to perform intra-socket memory mirroring on different channels coupled to a single memory controller.

FIG. 1A illustrates a memory system operable to perform intra-socket memory mirroring on different channels coupled to a single memory controller. The memory system includes a memory controller (not explicitly shown) integrated in the CPU 110. The CPU 110 is coupled to four exemplary memory channels 121-124, with each channel coupled to three DIMMs. As shown, the three DIMMs on channel 121 are used to store primary data, while the other three DIMMs on a different channel 122 are used to store the backup copy of the data. A tradeoff of such a design is that half of the channel bandwidth and capacity cannot be used for memory operations because two of the channels are dedicated to store backup data. That is, the CPU can access only half of the channel bandwidth during normal operation.

Figure 1B:
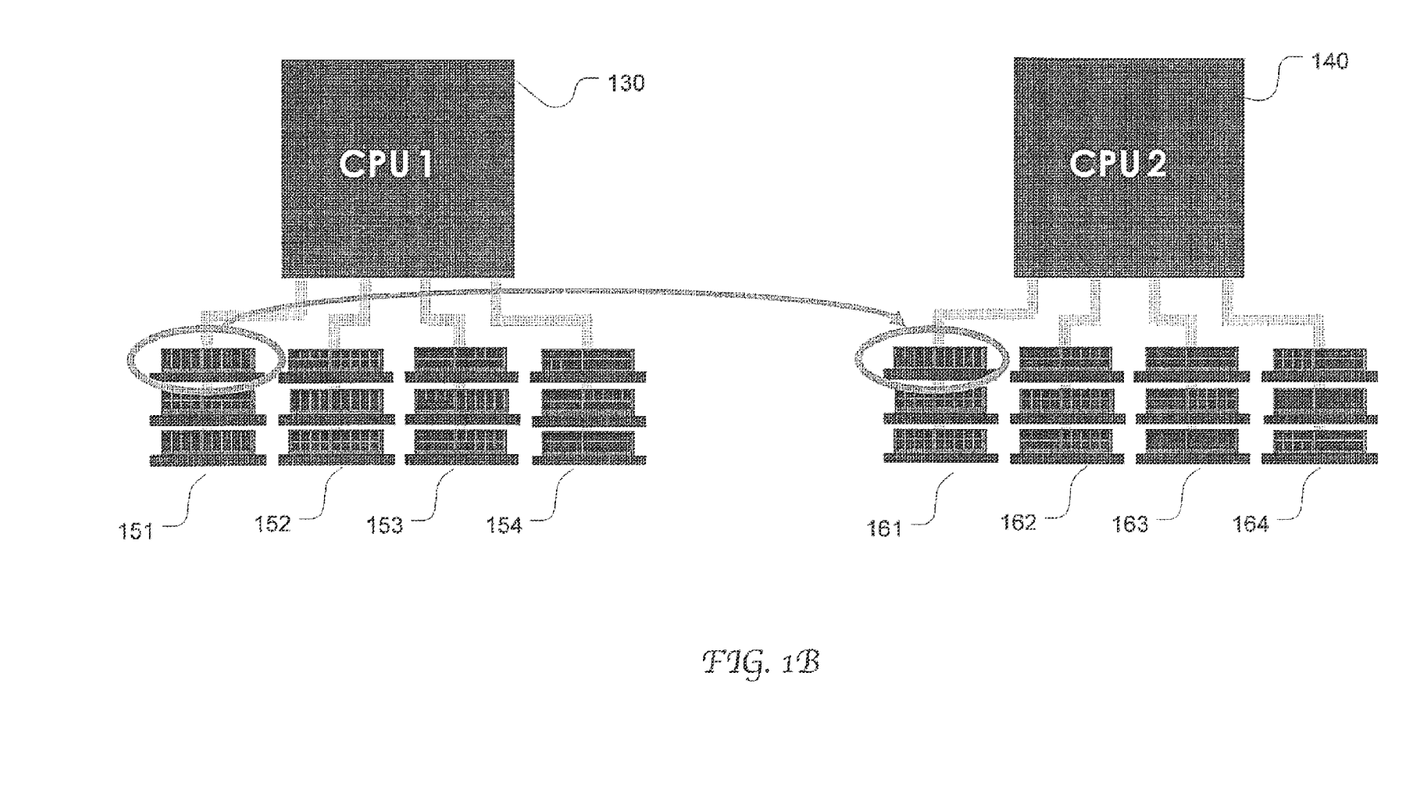
FIG. 1B illustrates a memory system operable to perform inter-socket memory mirroring on channels coupled to different controllers.

FIG. 1B illustrates a memory system operable to perform inter-socket memory mirroring on channels coupled to different controllers. All the memory modules (associated with channels 151-154) that are coupled to a first memory controller 130 (e.g., integrated in a CPU) are used to store a primary copy of data, while all the memory modules (associated with channels 161-164) that are coupled to a second memory controller 140 are used to store a backup copy of the data. In such a design, an associated CPU 130 or 140 can access full bandwidth as all four channels can be used at one time. However, half of the memory capacity and CPUs are not regularly used in this configuration, because they are dedicated to the backup copy.

Figure 1C:
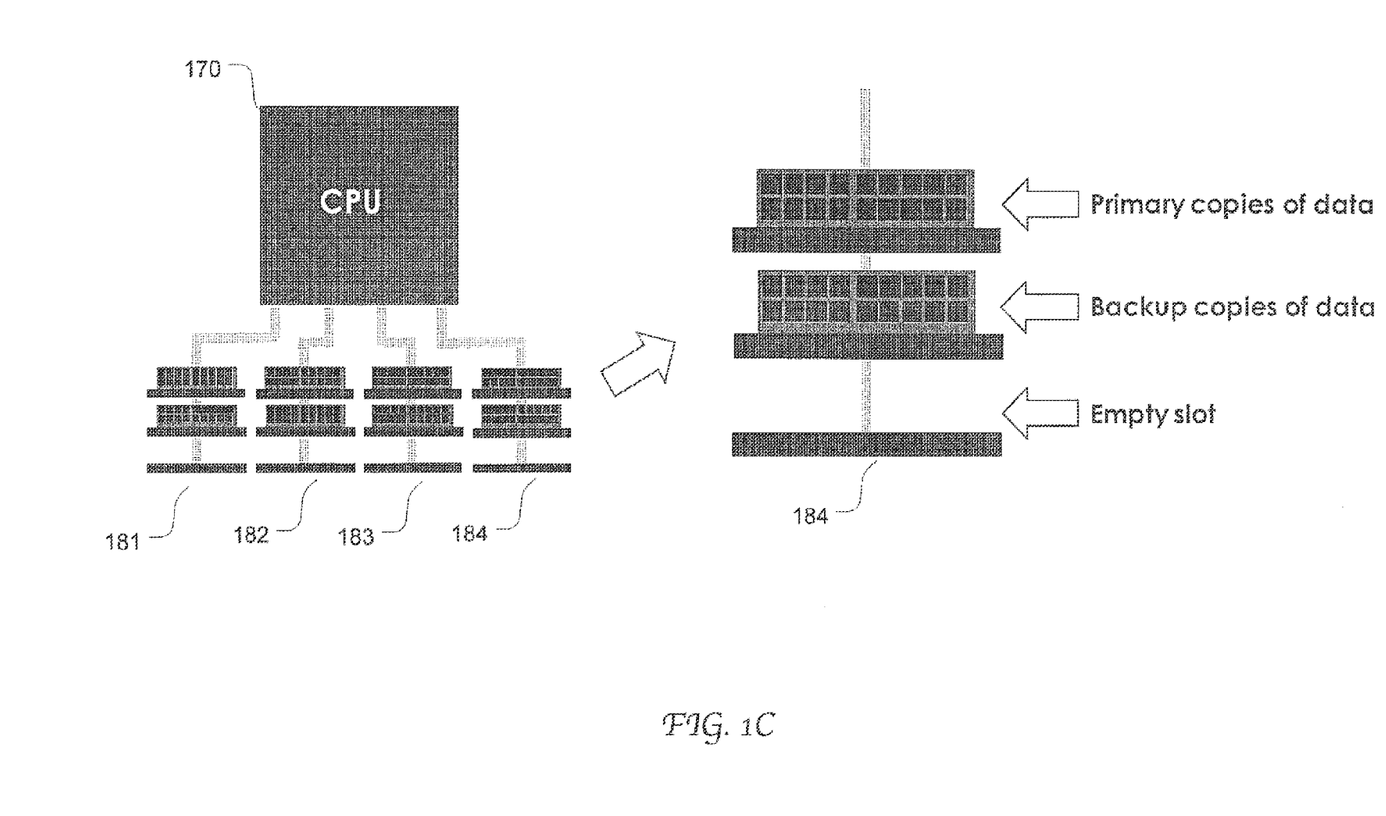
FIG. 1C illustrates a memory system operable to perform intra-socket memory mirroring on a single channel.

FIG. 1C illustrates a memory system operable to perform intra-socket memory mirroring on a single channel. The memory system includes a memory controller (not explicitly shown) integrated in the CPU 170. The CPU is coupled to four memory channels 181-184, with each channel coupled to three DIMMs. Within each channel, the first DIMM is used to store a primary copy of data, and the second DIMM is used to store a backup copy of the data. The drawback of this configuration is that the third module slot ("Empty slot") is usually unused due to lack of a pairing partner for mirroring within the same channel because it is an odd number. Thus, only ⅔ of the memory capacity is used, resulting in wasted memory capacity.

Figure 2A:
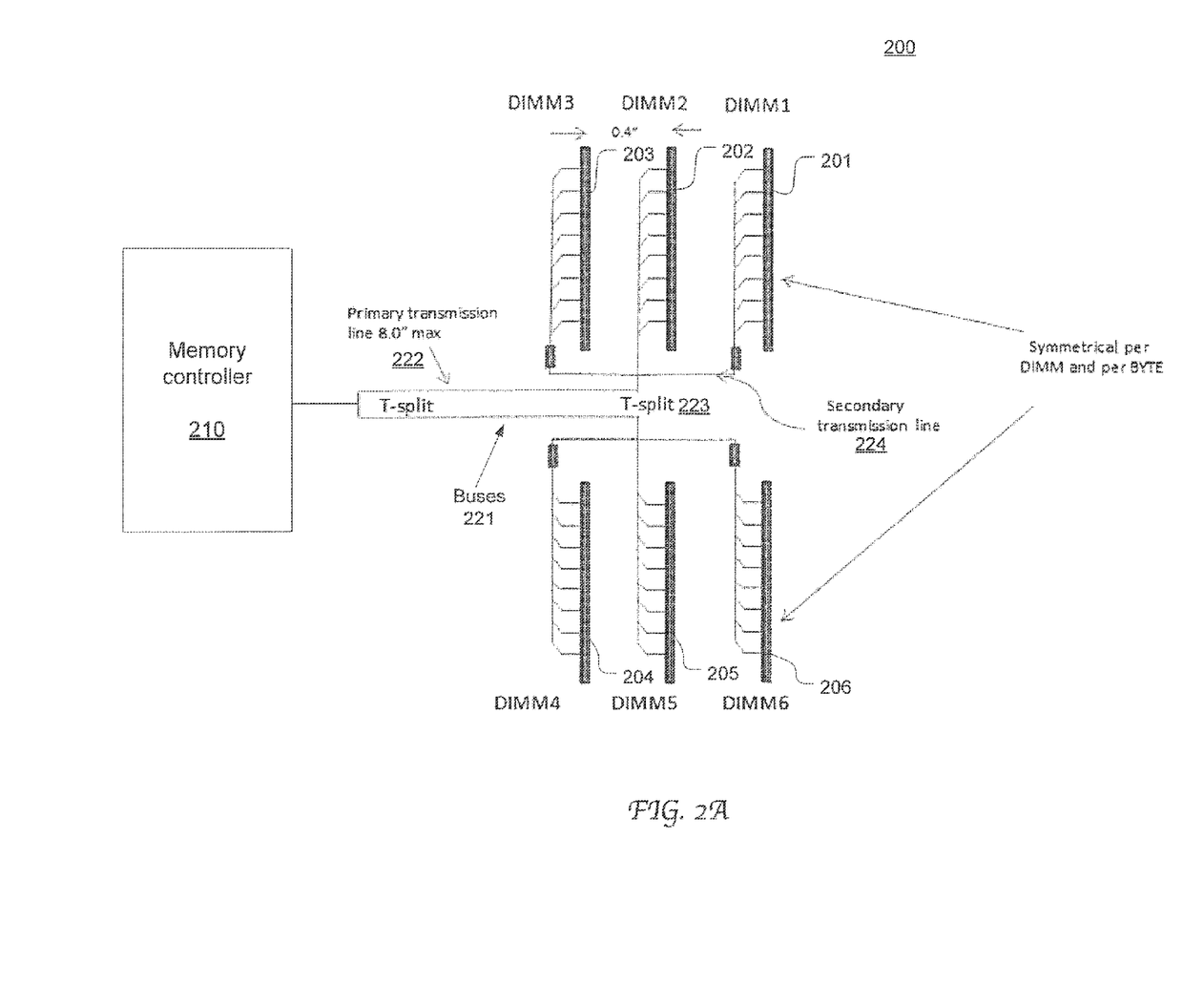
FIG. 2A illustrates an exemplary channel topology in a memory system capable of performing a single write operation to store data to two modules simultaneously within the same channel in accordance with an embodiment of the present disclosure.

FIG. 2A illustrates an exemplary channel topology in a memory system 200 capable of performing a single write operation to store data to two modules within the channel in accordance with an embodiment of the present disclosure. In this example, the memory controller 210 is coupled to one memory channel including the communication channel (or buses) 221 and to 6 DIMMs 201-206. However, it will be appreciated that the present disclosure is not limited by the number of channels coupled to a memory controller or by the number of modules encompassed in a channel.

It will be appreciated that each memory module has an array of memory chips. The memory modules within a channel may have the same type or different types of memory chips selected from Dynamic Random Access Memory (DRAM), Non-volatile memory (NVM) e.g., Flash memory, erasable programmable read-only memory (EPROM), programmable read-only memory (EPROM), and etc. Further, the DIMM modules within a channel can be single data rate (SDR), double data rate (DDR), load-reduction (LR), or registered (R)DIMMs, or a combination thereof, etc.

According to the illustrated channel topology, the 6 DIMMs 201-206 are arranged symmetrically with respect to the memory controller 210. It will be appreciated that the buses 221 have wires directed to each DIMM and include data buses, command buses, and address buses. The address buses include chip select buses directed to individual memory chips on each DIMM. Further the buses 221 include a single primary transmission line 222 (e.g., 8.0" long maximum) routed from the memory controller 210 to a T-split 223 disposed proximate to the 6 DIMMs 201-206. At the T-split 223, the primary transmission line is split into secondary transmission lines (e.g., 224) directed to individual DIMMs, e.g., through DIMM sockets. For instance, two adjacent parallel sockets are spaced apart by 0.4".

As shown, the channel topology 200 has two symmetric halves, the upper half including DIMM 1-3 201-203 and the lower half including DIMM 4-6 204-206. The buses directed to DIMM 2 and DIMM 5 have the same trace length and thus have the same signal latency. These are a matching pair of memory DIMMs. The buses directed to DIMM 1, 3, 4, and 6 have the same trace length and thus have the same signal latency. These are a matching group of DIMMs. Effectively, the DIMMs 201-206 in the memory channel are divided into two latency groups, one group including DIMMs 2 and 5 (202 and 205) and the other group including 1, 3, 4, and 6 (201, 203, 204 and 206). It is appreciated that the DIMMs within the same latency group share the same signal timing, e.g., flight time for data signals, command signals, or address signals, etc.

More specifically, each memory chip on a DIMM has a counterpart chip in every other DIMM in the same latency group. The signal latency to the memory chip is the same as to its counterpart chips.

Because all the DIMMs within each latency group have the same signal latency, two DIMMs within a latency group can be paired-up to store primary data and backup data respectively and can effectively receive the data in a single write operation. For example, DIMM 2 202 can be paired with DIMM 5 205, DIMM 3 203 can be paired with DIMM 4 204, and DIMM 1 201 can be paired with DIMM 6 206 for memory mirroring purposes. DIMMs 1, 2, 3 can be used to store primary copies while DIMMs 4, 5, 6 can be used to store corresponding backup copies.

Figure 2B:
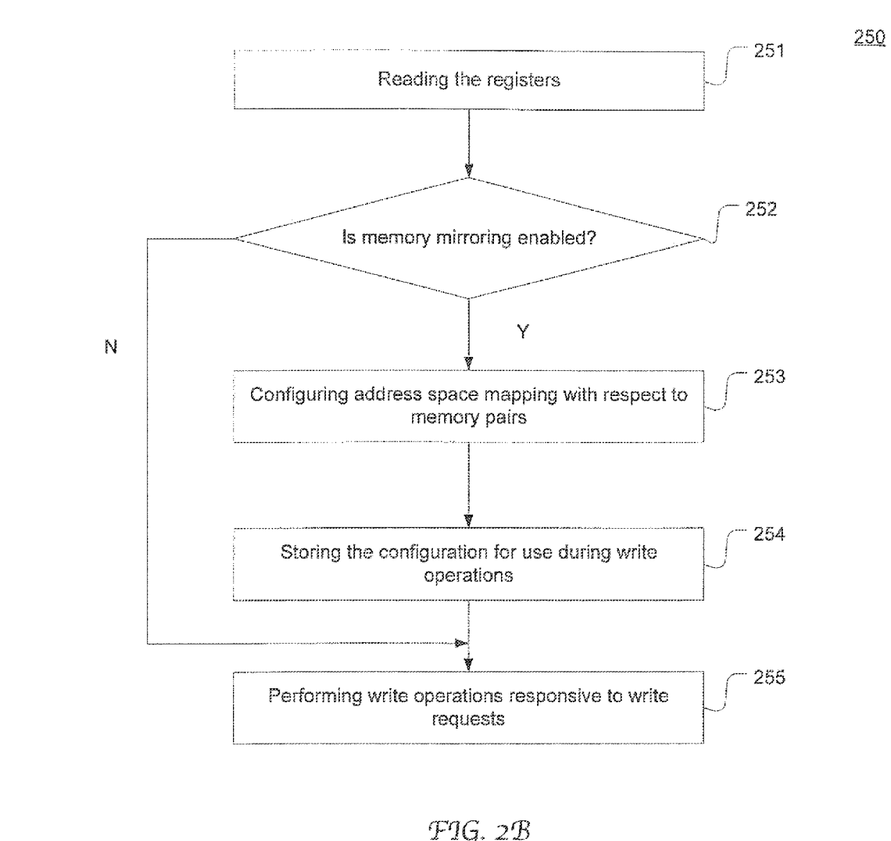
FIG. 2B is a flow chart depicting an exemplary process of storing data by memory mirroring in accordance with an embodiment of the present disclosure.

In some embodiments, all the mirrored DIMMs 201-206 are included in a single packaged device which also includes the T-splits 222 and 223. Because data as well as the corresponding write command are sent from the memory controller and can respectively arrive at a pair of DIMMs (e.g., DIMM 2 and 5) at the same time, the data can be written on to the pair of DIMMs simultaneously, and more particularly, in a single write operation. FIG. 2B is a flow chart depicting an exemplary process 250 of storing data by memory mirroring in accordance with an embodiment of the present disclosure. For example, process 250 can be performed by a memory system as shown in FIG. 2A, FIG. 3, FIG. 4, FIG. 5A, FIG. 5B or FIG. 7.

Referring to the system 200 in FIG. 2A by way of example. At 251, the system 200 reads registers and, at 252, determines if memory mirroring is enabled and which module will be used. For instance, the step 251 may be performed at boot time. If memory mirroring in enabled, at 253, the system 200 automatically configures the address space mappings to place primary and backup copies of data where they need to be with respect to the mirror pairs. At 254, the configuration is stored for use during subsequent write operations. At 255, write operations are performed responsive to write requests.

As will be described in greater detail with reference to FIG. 8, during a write operation, the memory controller 210 transmits each of the command, address and data signals to the pair of DIMMs once, e.g., pair of DIMM 5 and DIMM 2, for instance. Chip selects are enabled for the pair of DIMMs at the same time, and more specifically for the selected chips on the two DIMMs. Thus, responsive to a single write command, a primary copy and a backup copy of the data are saved respectively in different memory locations simultaneously and with a single write operation.

Advantageously, there is no additional write latency introduced for purposes of generating the backup copy. Compared with the conventional approach wherein two separate write operations are needed to store the primary and backup copies of data, the memory topology 200 according to the present disclosure advantageously enables memory mirroring with reduced power consumption and improved write performance of the memory system.

Moreover, because the memory channel includes an even number of DIMMs, each DIMM can be paired up with another DIMM within the same channel. A memory channel can be efficiently utilized without causing a DIMM slot to be unused.

Since the same memory write operation feeds both DIMM units of a matching latency group, in one embodiment, it may be beneficial to increase the nominal drive strength of the signals over the shared bus lines to accommodate both DIMMs.

It will be appreciated that the present disclosure is not limited by techniques and configurations used to achieve matching latency for the modules within a latency group. In some other embodiments, suitable delay elements well known in the art can be inserted in a communication channel and configured to obtain the same latency among the multiple modules within a group.

Figure 3:
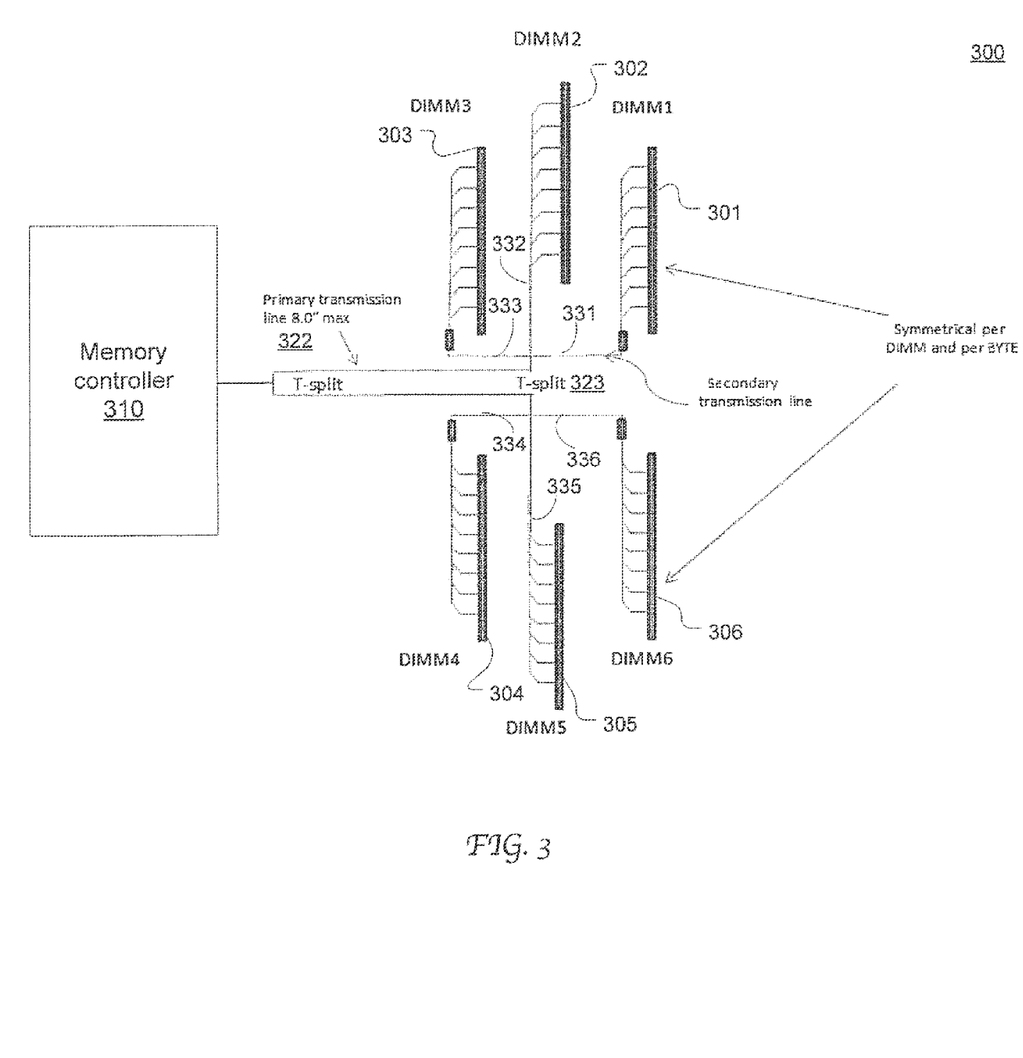
FIG. 3 illustrates another exemplary channel topology in a memory system capable of performing a single write operation to broadcast data to all modules simultaneously within the channel in accordance with an embodiment of the present disclosure.

FIG. 3 illustrates another exemplary channel topology in a memory system 300 capable of performing a single write operation to broadcast data to all modules within the channel in accordance with an embodiment of the present disclosure. The memory topology in FIG. 3 is similar with the memory topology 200 illustrated in FIG. 2. However, the buses are configured such that all the DIMMs (1-6) in the memory channel are in the same latency group, or share the same timing. As shown, the secondary transmission lines 332 and 335 directed to DIMMs 2 and 5 from the T-split 323 are routed with extra lengths to match the trace length of the buses directed to DIMMs 1, 3, 4, and 6. In this configuration, a data can be stored at six locations in a single write operation responsive to one write command as all bus lengths and times are matched. That is, the data can be concurrently broadcast to all the DIMMs within the channel. For instance, such an operation can be used to broadcast code into buffers on all the modules and the code can be executed in the buffers.

As discussed above, in a write operation in system 300 according to the present disclosure, as a single signal (e.g., a data signal) needs to be transmitted to and detected by multiple memory locations, the drive strength (e.g., voltage) for the signal may be adjusted higher at the memory controller accordingly.

It will be appreciated the memory controller can be implemented as a separate chip or integrated in a host device, such as a CPU, a coprocessor, a GPU, a Field-Programmable Gate Array (FPGA), Application-Specific Integrated Circuit (ASIC), etc.

Figure 4:
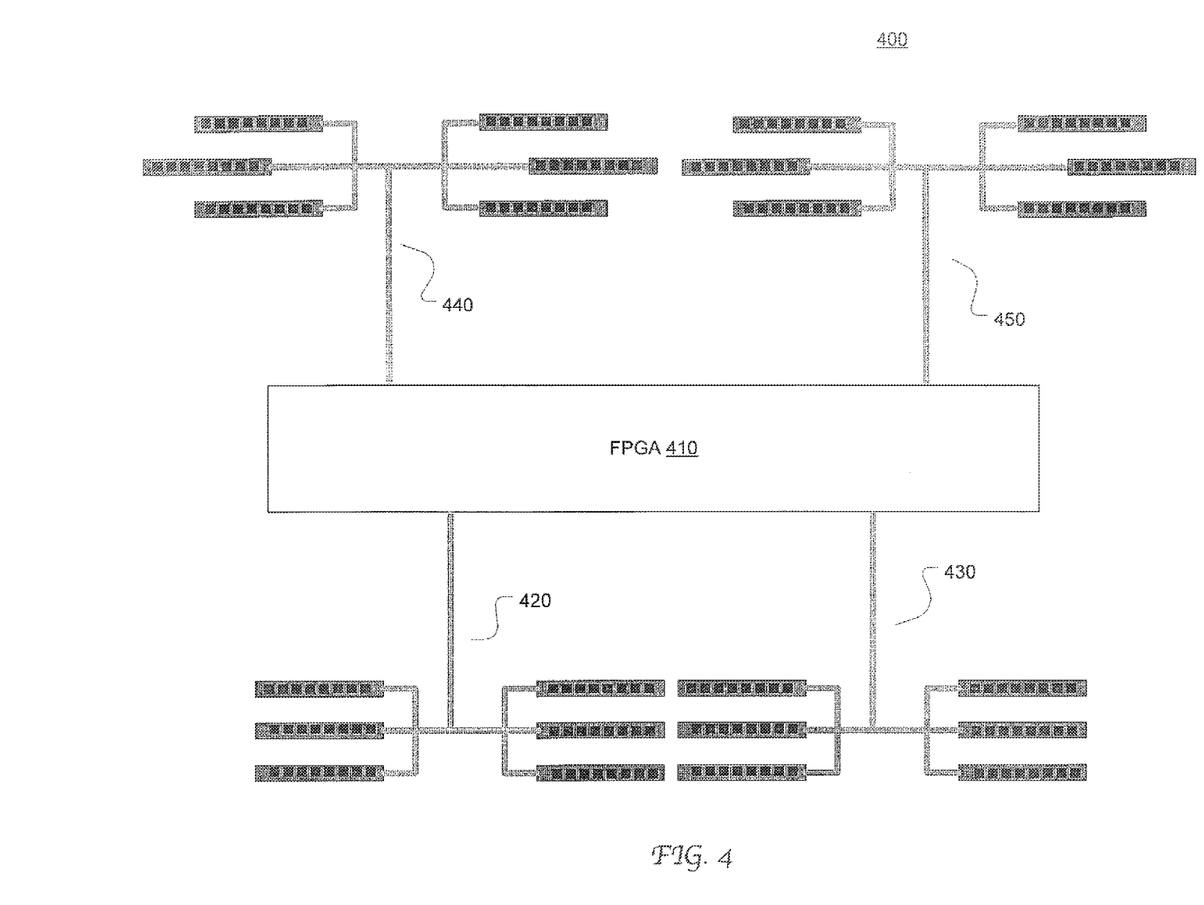
FIG. 4 illustrates an exemplary memory system having a memory controller coupled to four memory channels of different topologies in accordance with an embodiment of the present disclosure.

FIG. 4 illustrates an exemplary memory system 400 having a memory controller 410 coupled to four memory channels 420-450 of different topologies in accordance with an embodiment of the present disclosure. The memory controller is a FPGA device in this example. Each memory channel has an even number of DIMMs that are grouped into one or more latency groups, as described in greater detail above. Within each latency group, the DIMMs can be paired up to store primary and backup copies of data. In some other embodiments, the FPGA could be replaced with an ASIC.

The memory system combines two types of channel topologies. The channels 440 and 450 are each configured to have a single latency group as described with reference to FIG. 3. The other two channels 420 and 430 are each configured to have two latency groups as described with reference to FIG. 2. In some other embodiments, all the channels of a memory system have the same channel topology.

Embodiments of the present disclosure also provide an approach of performing a single write operation to store duplicate copies of a data element in multiple memory locations that have different propagation times for data signals transmitted from the memory controller. The approach presented herein involves controlling the timing offsets of respective clock and control signals between the two memory locations based on corresponding propagation delay. Thus, the data element can be written to these locations substantially in parallel in accordance with a single write operation rather than with, for example, two sequential write operations to store a primary and a backup copy of a data element with each write operation using a different propagation delay between the memory locations.

Figure 5A:
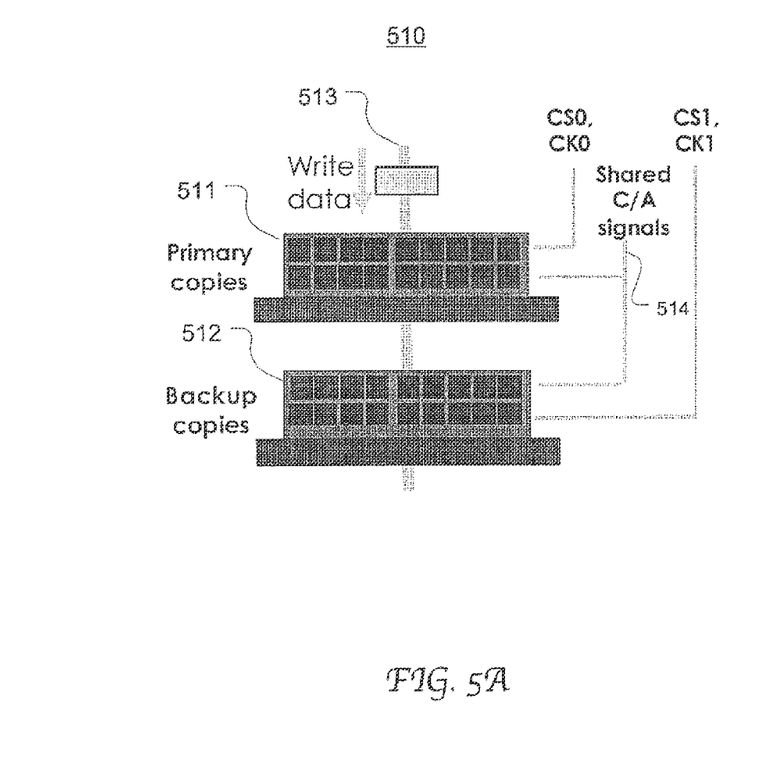
FIG. 5A illustrates an exemplary memory channel configured to store a data element to two memory modules in a single write operation where the data element arrives at the two modules at different times, e.g., with different signal delay, in accordance with an embodiment of the present disclosure.

FIG. 5A illustrates an exemplary memory channel design 510 configured to store a data element to two memory modules in a single write operation where the data element arrives at the two modules at different times (due to different propagation delay) in accordance with an embodiment of the present disclosure. The two memory locations are located on module A 511 and module B 512 respectively, which may be DIMM modules. The modules 511 and 512 are assigned to store primary copies and backup copies respectively. A data signal sent from the memory controller (not explicitly shown) arrives at the modules 511 and 512 in different times due to the propagation delay, on the channel 513.

As shown, each module 511 or 512 is coupled to separate chip select (CS), clock (CK), on-die termination (ODT), and clock enable (CKE) signal lines. The command and address (C/A) lines are shared between the modules A and B, which allows the same data to be written to the same addresses in the two modules 511 and 512. This configuration can reduce the number of pins on the host device (e.g., a CPU) controlling the memory channel 510 and the number of wires or lines on the board.

During initialization, the memory controller (not shown) determines the best timing relationship between CS, CK and the C/A bits so that data can be reliably stored to each module. When memory mirroring is not being enabled, the memory controller determines which modules the data is being written to, and drives the C/A bits, as well as the CS, CK signals at appropriate timing for the proper memory module.

When memory mirroring is enabled, the memory controller activates the CS and CK signals for both modules at the appropriate times (e.g., with a predetermined and slight time offset) in a single write operation, such that the data can be written to the two modules at substantially the same time. More specifically, during a single write operation, a write command is issued from the memory controller once, and the CS, CK, CKE and ODT signals are driven at appropriate times relative to the command and address (C/A) signals to each module 511 and 512 to capture and store data as the data passes along the channel 513 from the memory controller.

Figure 5B:
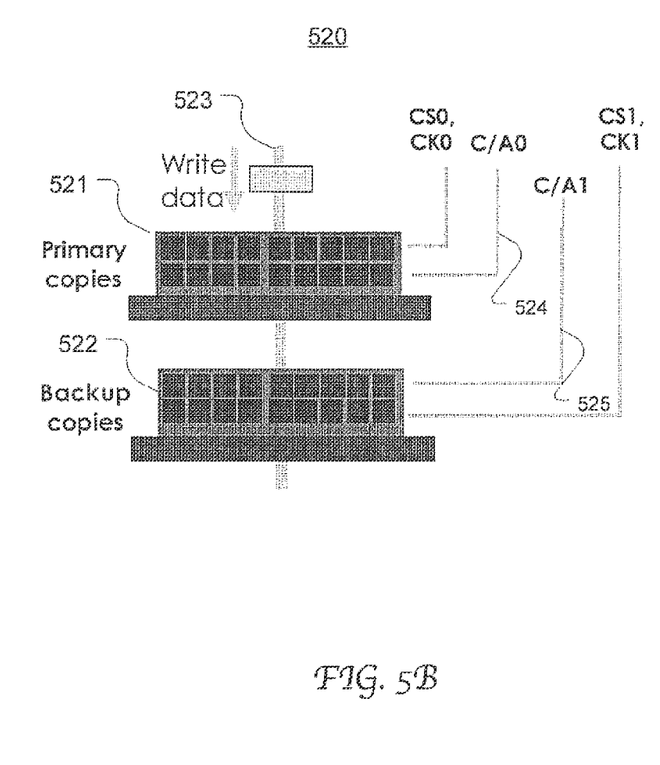
FIG. 5B illustrates another exemplary memory channel configured to store a data element to two memory modules in a single write operation where the data element arrives at the two modules at different times in accordance with an embodiment of the present disclosure.

FIG. 5B illustrates another exemplary memory channel design 520 configured to store a data element to two memory modules in a single write operation where the data element arrives at the two modules at different times in accordance with an embodiment of the present disclosure. The channel 520 has a similar configuration with the channel 510 in FIG. 5A except that the two modules 521 and 522 are coupled to separate command and address lines 524 and 525 (CA_A and CA_B). This allows the same data to be written to different or the same addresses in the two modules 521 and 522 using the same write operation. Although using separate command and address lines for the two modules requires additional pins on the associated host device and additional wires on the circuit board, it can provide better timing characteristics and in some cases higher operating speed than the configuration shown in FIG. 5A, and generally provides increased memory addressing flexibility.

When memory mirroring is enabled, the memory controller activates the C/A, CS and CK signals for both modules at the appropriates times to make sure that both can store the write data as it passes by each module on the way down the channel within the single write operation.

Figure 6:
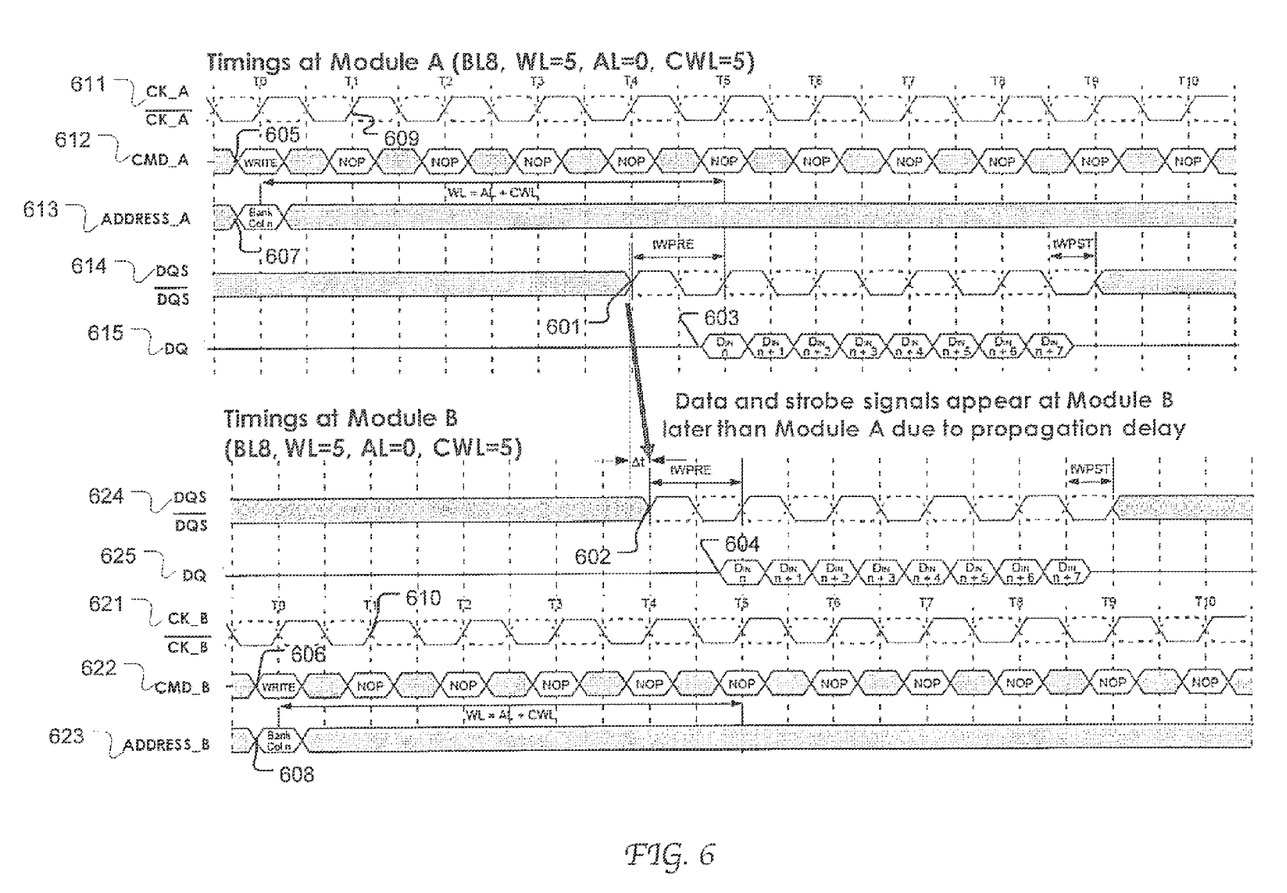
FIG. 6 illustrates sample timing diagrams of various signals at two memory modules used to store a data element in an exemplary single write operation according to an embodiment of the present disclosure.

FIG. 6 illustrates sample timing diagrams of various signals at two memory modules used to store primary and backup data in an exemplary single write operation according to an embodiment of the present disclosure. The write operation in this example is performed at an exemplary memory channel with two modules disposed in series along the buses, with each module coupled to separate chip select, clock, command and address lines, as shown in FIG. 5B.

The clock diagrams 611 and 621 (CK_A and CK_B) represent the clock signals at module A and module B respectively. The command diagrams 612 and 622 (CMD_A and CMD_B) represent write command signals at the two modules respectively. The address diagrams 613 and 623 (ADDRESS_A and ADDRESS_B) represent address signals at the two modules respectively. The DQS diagrams 614 and 624 represent the data strobe signals at the two modules respectively. The DQ diagrams 615 and 625 represent the data signals at the two modules respectively.

This write operation is configured to have a burst length of 8 (BL=8), write latency of 5 (WL=5), additive latency of 0 (AL=0), column address strobe write latency of 5 (CWL=5). During the write operation, the memory controller transmits write data signals (DQ) and a strobe (DQS) asserting data validity on the data bus to both modules in the memory channel. Due to propagation delay (Δt) the strobe (DQS) first appears at module A at time 601 and then at module B at time 602. Also, the data signal (DQ) appears at module A at 603 and module B at 604 with the same delay (Δt). It will be appreciated that the memory controller is configured to provide a sufficient drive strength for the data signal to be suitably detected by both memory locations.

To compensate the propagation delay (Δt) of the data signals along the data buses, the memory controller activates the clock and control signals for module B (CK_B 623, CMD_B 624, ADDRESS_B 625, and chip select signal (not shown)) relative to when the data and strobe signals reach module B. More specifically, as shown, a time offset Δt is added between CMD_A and CMD_B (see 605 and 606), between CK_A and CK_B (see 607 and 608), and between ADDRESS_A and ADDRESS_B (see 609 and 610).

In this write operation, the memory controller issues a write command (through separate command lines) and transmits the write data and strobe to the two modules only once for the data element. The eight data elements ($D_{in}$ n to $D_{in}$ n+7 in diagram 615 and 625) are written to the two modules in parallel with a slight time offset (Δt).

Figure 7:
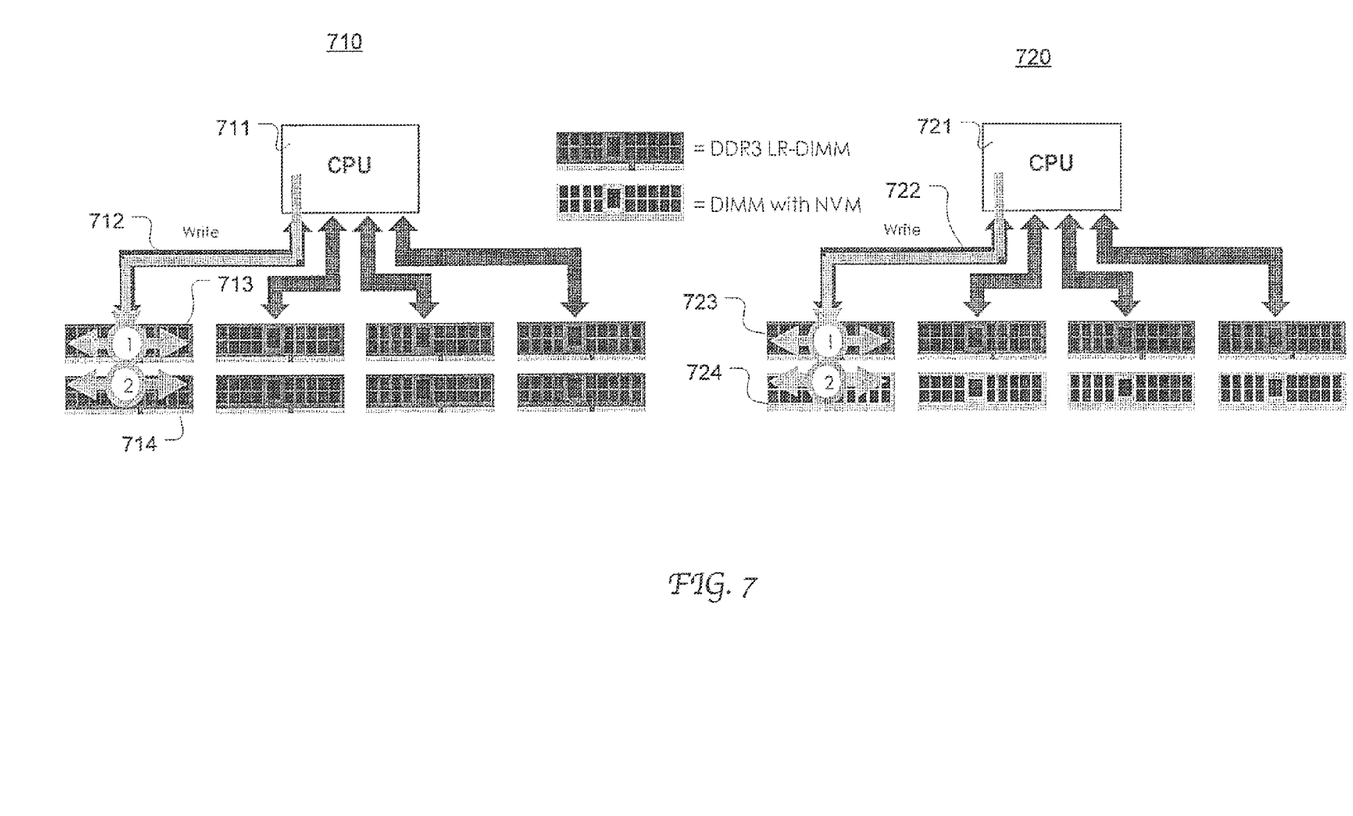
FIG. 7 illustrates exemplary memory systems capable of storing data into two memory locations in a single write operation in accordance with an embodiment of the present disclosure.

FIG. 7 illustrates exemplary memory systems 710 and 720 capable of storing a data element into two memory locations in a single write operation in accordance with an embodiment of the present disclosure. The exemplary memory system 710 has a memory controller (not explicitly shown) integrated in the CPU 711 and four channels, each channel including two modules (e.g., 713 and 714) of the same memory type disposed in series along the buses (e.g., 712). Each module in system 710 is a DDR3 LR-DIMM. The memory system 720 has a memory controller (not explicitly shown) integrated in the CPU 711 and four channels, each channel including two modules of different memory types disposed in series along the buses (e.g., 722). In this example, the module 723 is a DDR3 LR-DIMM while the module 724 is a DIMM with NVM (e.g., Flash memory).

Both systems 710 and 720 are configured to write a data element to different modules within a channel in a single write operation, whether the modules are of the same type or of different types. In such a single write operation for memory mirroring, the memory controller sends only one write command to both modules (through the same or separate command lines) at substantially the same time. The memory controllers sends data signals only once to both modules through the data buses, which advantageously eliminates the write latency and additional power consumption caused by performing two separate write operations for storing a data element, one for each module, as required in conventional memory mirroring techniques.

Figure 8:
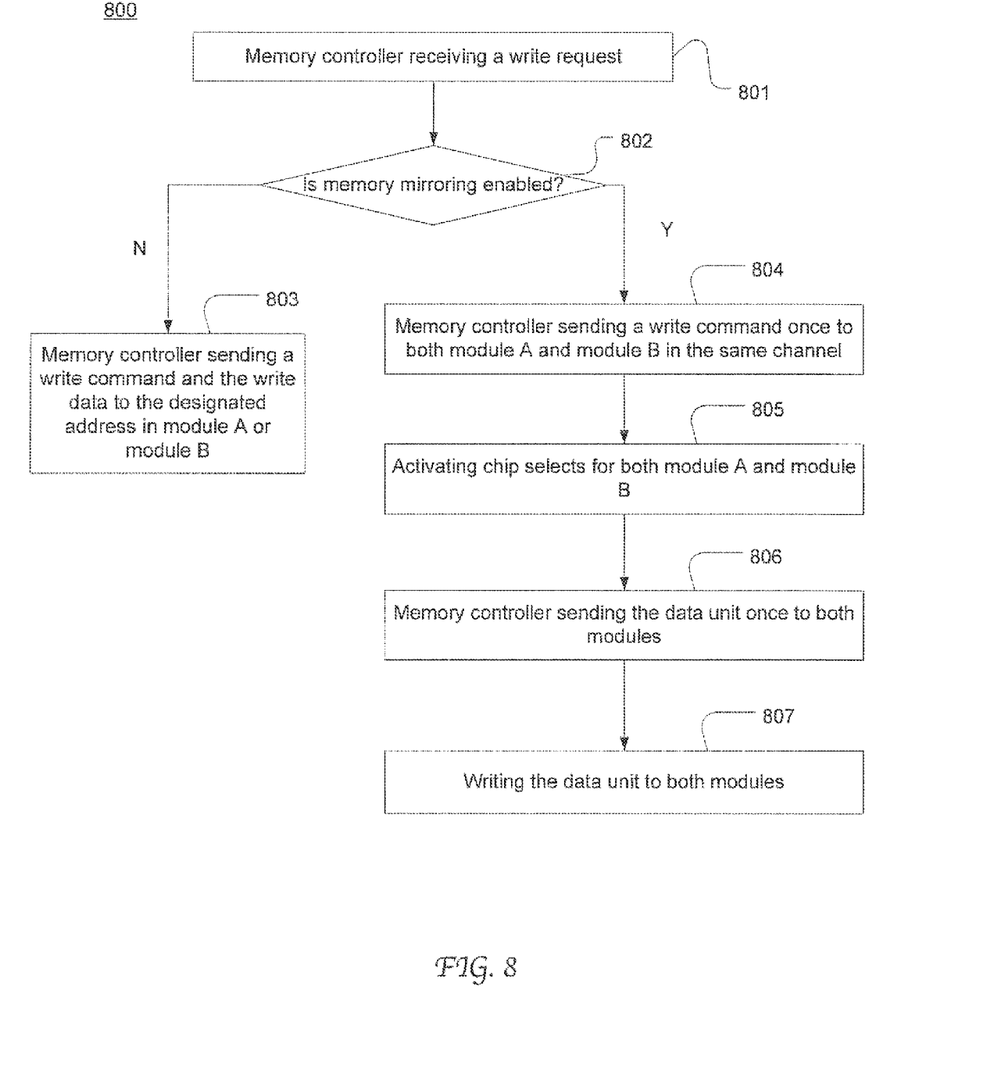
FIG. 8 is a flow chart depicting an exemplary memory mirroring process in which a data element is written to two memory locations in a single write operation in accordance with an embodiment of the present disclosure.

FIG. 8 is a flow chart depicting an exemplary memory mirroring process 800 in which a data element is written to two memory locations in a single write operation in accordance with an embodiment of the present disclosure. The process can be performed on a memory system including a memory controller and a memory channel having at least two memory modules (e.g., DIMMs), for example as shown in FIGS. 2-4, FIG. 5A, FIG. 5B or FIG. 7. Referring to the Memory System 200 by way of example, module "A" or DIMM 1 201 is used to store primary data and module "B" 202 is used to store backup data. At 801, the memory controller receives a write request to store a data element in the memory. If it is determined that memory mirroring is disabled at 802 (e.g., by reading the configuration stored at step 254 in FIG. 2B), the memory controller 210, at 803, sends a write command and the data element to the designed address in module A 201. As such, only one copy of the data is stored in the memory.

If memory mirroring is enabled, the memory controller sends a write command only once to both memory locations on the two modules 201 and 202 at 804. At 805, the corresponding chip selects are activated for both modules 201 and 202. At 806, the memory controller 210 sends the data only once to both memory locations. In response to this single data transmission event from the controller, the data element is captured and written to both locations in the two modules 201 and 202, thereby creating a primary copy and a backup copy of the data using a single write operation.

Reference has been made in detail to the preferred embodiments of the present disclosure, examples of which are illustrated in the accompanying drawings. While the disclosure is described in conjunction with the preferred embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the detailed description of embodiments of the present disclosure, numerous specific details have been set forth in order to provide a thorough understanding of the present disclosure. However, it will be recognized by one of ordinary skill in the art that the present disclosure may be practiced without these specific details. In other instances, well-known methods, procedures, components, and circuits have not been described in detail so as not to unnecessarily obscure aspects of the embodiments of the present disclosure. The drawings showing embodiments of the disclosure are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the disclosure can be operated in any orientation.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or client devices. When a component appears in several embodiments, the use of the same reference numeral signifies that the component is the same component as illustrated in the original embodiment.

Although certain preferred embodiments and methods have been disclosed herein, it will be apparent from the foregoing disclosure to those skilled in the art that variations and modifications of such embodiments and methods may be made without departing from the spirit and scope of the disclosure. It is intended that the disclosure shall be limited only to the extent required by the appended claims and the rules and principles of applicable law.

What is claimed is:

1. A system comprising:
a memory controller; and
a memory channel coupled to said memory controller, said memory channel comprising:
 a communication channel directly coupled to said memory controller;
 a first dual-inline memory module (DIMM) directly coupled to said communication channel and having a first signal latency for signals sent from the memory controller to the first DIMM; and
 a second DIMM directly coupled to said communication channel and having a second signal latency for signals sent from the memory controller to the second DIMM,
 wherein said memory controller is configured to enable storage of a primary copy of data within said first DIMM and a secondary copy of the data within said second DIMM in a single write operation by transmitting:
  a copy of the data over the memory channel to the first DIMM and the second DIMM;
  a first clock signal to the first DIMM; and
  a second clock signal to the second DIMM, wherein the second clock signal is delayed with respect to the first clock signal based on the first and second signal latencies.

2. The system of claim 1, wherein, in said single write operation, said memory controller is further configured to: transmit first write command and address signals to said first DIMM at a first time; and transmit second write command and address signals to said second DIMM at a second time, wherein said second time is delayed with respect to said first time based on the first and second signal latencies.

3. The system of claim 1, wherein, in said single write operation, said memory controller is further configured to transmit same command and address signals concurrently to said first DIMM and said second DIMM.

4. The system of claim 1, wherein said first DIMM and said second DIMM are coupled to different command and address buses.

5. The system of claim 1, wherein, in said single write operation, said first DIMM is configured to start storing said data at a first time, and said second DIMM is configured to start storing said data at a second time, wherein said second time is delayed with respect to said first time based on the first and second signal latencies.

6. The system of claim 1, wherein, in said single write operation, said memory controller is further configured to transmit a strobe signal concurrently to said first DIMM and said second DIMM.

7. The system of claim 3, wherein, in said single write operation, said memory controller is further configured to activate chip selects of said first DIMM and said second DIMM respectively and sequentially based on a difference between the first and second signal latencies.

8. A system comprising:
a memory controller; and
a memory channel comprising:
 a communication channel directly coupled to said memory controller; and
 a plurality of memory modules comprising a first module and a second module, wherein said first module and said second module are directly coupled to said communication channel,
wherein said memory controller is configured to:
 determine a propagation delay between said first module and said second module with respect to signals transmitted from said memory controller;
 send a data signal representing a data element in a single transmission to said first module and said second module via data buses of said communication channel; and
 send clock signals and control signals respectively to said first module and said second module, wherein said clock signals and said control signals are respectively timed based on said propagation delay, and
 wherein said first module and said second module each are configured to store said data element responsive to said data signal and said control signals.

9. The system of claim 8, wherein said first module and said second module are coupled to same command and address buses of said communication channel, and wherein further said memory controller is further configured to send a write command signal in a single transmission to said first module and said second module.

10. The system of claim 8, wherein said control signals comprise chip select signals and on-die termination signals.

11. The system of claim 8, wherein said first module is configured to start storing said data element at a first time and said second module is configured to start storing said data element at a second time respectively, and wherein said second time differs from said first time by said propagation delay.

12. The system of claim 8, wherein said memory controller is integrated in a central processing unit (CPU).

13. The system of claim 8, wherein said data buses have different trace lengths between said memory controller and said first module and between said memory controller and said second module.

14. The system of claim 8, wherein said first module comprises a dual in-line memory module (DIMM) and is assigned to store a primary copy of said data element, and wherein further said second module comprises a non-volatile memory module and is assigned to store a backup copy of said data element.

15. The system of claim 8, wherein said first module and said second module are coupled to separate command and address buses of said communication channel, and wherein further said memory controller is further configured to send write command signals in respective transmissions to said first module and said second module, wherein said respective transmissions are timed based on said propagation delay.

16. A method of storing data by memory mirroring, said method comprising:
    receiving at a memory controller a write request for storing a data element;
    transmitting by said memory controller a data signal representing said data element in a single write operation to store the data element at a primary memory device and a backup memory device; and
    transmitting, by said memory controller over a communication channel directly coupled to said primary memory device, a first control signal at a first time, and transmitting, by said memory controller over the communication channel directly coupled to said backup memory device, a second control signal at a second time that differs from said first time by a propagation delay between said primary and said backup memory device, wherein said first and said second control signals are operable to enable said primary memory device and said backup memory device to store said data element respectively,
    wherein said data signal and said first and said second control signals enable storage of a copy of said data element to said primary memory device and a copy of said data element to said backup memory device.

17. The method of claim 16, wherein said first and said second control signals are chip select signals, and further comprising transmitting a write command signal by said memory controller to said primary memory device and said backup memory device in separate transmissions that are timed based on said propagation delay.

18. The method of claim 16 further comprising transmitting by said memory controller a first clock signal to said primary memory device and a second clock signal to said backup memory device, wherein said first clock signal and said second clock signal are timed based on said propagation delay.

19. The method of claim 16 further comprising transmitting by said memory controller an address signal to said primary memory device and said backup memory in a single transmission via an address bus, wherein said address bus is shared by said primary memory device and said backup memory device.

20. The method of claim 16, wherein said data element is sent to different addresses in said primary memory device and said backup memory device for said storage.

21. The system of claim 1, wherein the communication channel directly coupled to said memory controller comprises:
    a primary transmission line coupled to the memory controller;
    a first secondary transmission line coupled to the primary transmission line and the first DIMM; and
    a second secondary transmission line coupled to the primary transmission line and the second DIMM.

22. The system of claim 21, wherein the communication channel directly coupled to said memory controller further comprises a splitter disposed on a circuit board, the splitter to split the primary transmission line into the first transmission line and the second secondary transmission line.

23. The system of claim 8, wherein the communication channel directly coupled to said memory controller comprises:
    a primary transmission line coupled to the memory controller;
    a first secondary transmission line coupled to the primary transmission line and the first module; and
    a second secondary transmission line coupled to the primary transmission line and the second module.

24. The system of claim 8, wherein the communication channel directly coupled to said memory controller comprises:
    a first set of wires coupled between to the memory controller and a splitter;
    a second set of wires coupled between the splitter and the first module; and
    a third set of wires coupled between the splitter and the second module.

* * * * *